United States Patent [19]

Snyder

[11] 4,196,936

[45] Apr. 8, 1980

[54] TRAILER BRAKE CONTROL SYSTEM

[75] Inventor: Robert C. Snyder, Country Club Hills, Ill.

[73] Assignee: Motor Wheel Corporation, Lansing, Mich.

[21] Appl. No.: 876,876

[22] Filed: Feb. 13, 1978

[51] Int. Cl.² .............................................. B60T 7/20
[52] U.S. Cl. .................................... 303/20; 303/24 A; 303/24 C; 188/112 A; 200/61.45 R; 324/174; 361/236
[58] Field of Search ...................... 303/96, 20, 7, 24 A, 303/24 C, 100, 106, 110, 108, 92; 188/112 A; 73/510, 512; 180/104; 361/236, 238, 240, 241; 324/162, 166, 168, 173, 174; 200/61.45 R, 61.45 M

[56] References Cited

U.S. PATENT DOCUMENTS

| | | | |
|---|---|---|---|
| 3,244,259 | 4/1966 | Brede | 188/161 |
| 3,417,289 | 12/1968 | Jensen | 361/236 |
| 3,450,944 | 6/1969 | Burke | 303/96 |
| 3,909,075 | 9/1975 | Pittet | 303/24 C |
| 3,993,362 | 11/1976 | Kamins | 188/112 A |
| 4,030,756 | 6/1977 | Eden | 303/24 A |

FOREIGN PATENT DOCUMENTS 2522878  11/1975  Fed. Rep. of Germany ............. 303/96

*Primary Examiner*—Charles E. Frankfort
*Assistant Examiner*—Reinhard J. Eisenzopf
*Attorney, Agent, or Firm*—Barnes, Kisselle, Raisch & Choate

[57] ABSTRACT

A trailer brake control system which includes a variable frequency oscillator, an electromagnetic inertial sensor adapted to detect either lateral acceleration or longitudinal deceleration of a trailer and to vary the output frequency of the oscillator in accordance therewith, and a circuit for applying trailer brakes as a function of such frequency variation either to correct a trailer sway condition indicated by lateral trailer acceleration or when tractor brakes have been applied as indicated by longitudinal deceleration of the tractor/trailer combination.

22 Claims, 7 Drawing Figures

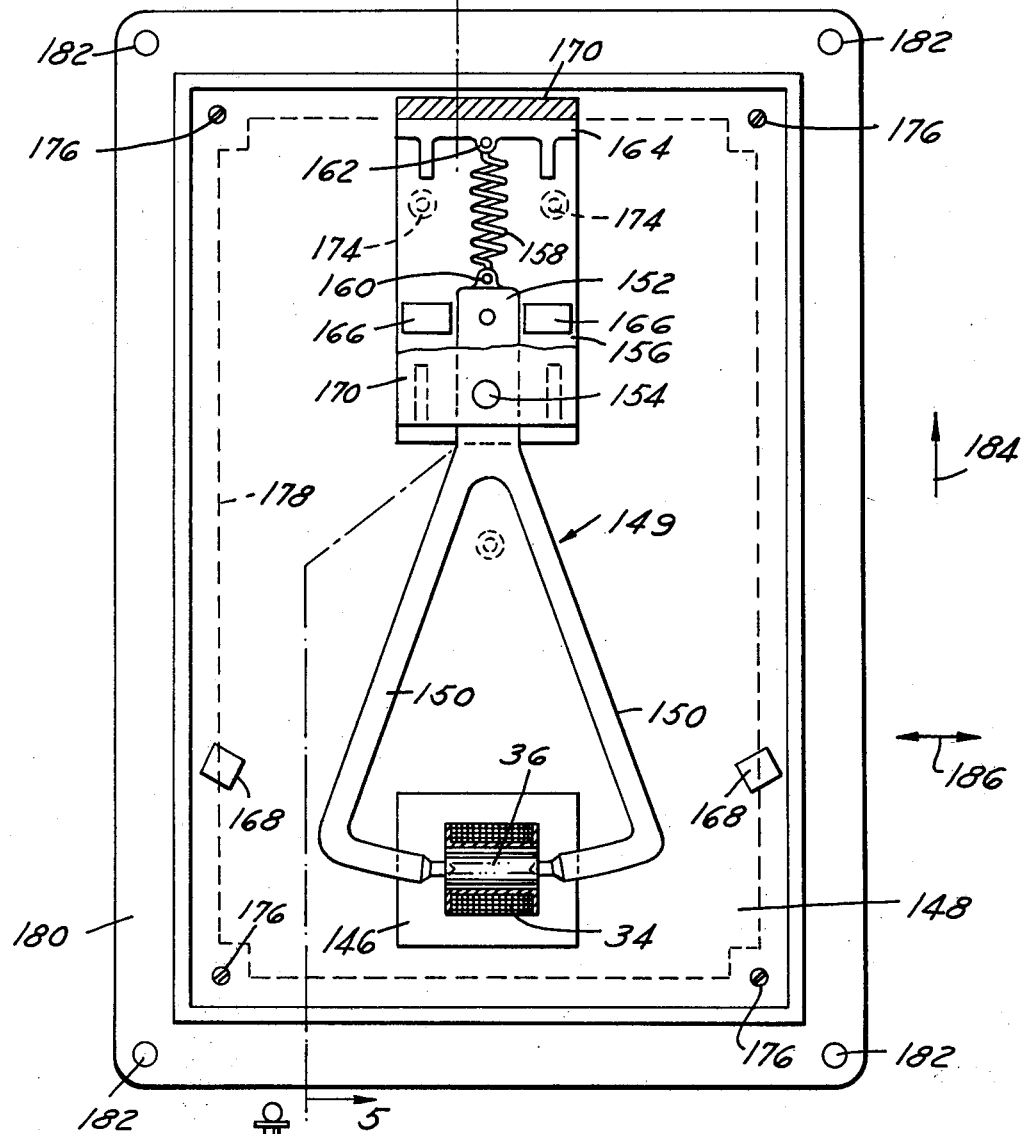
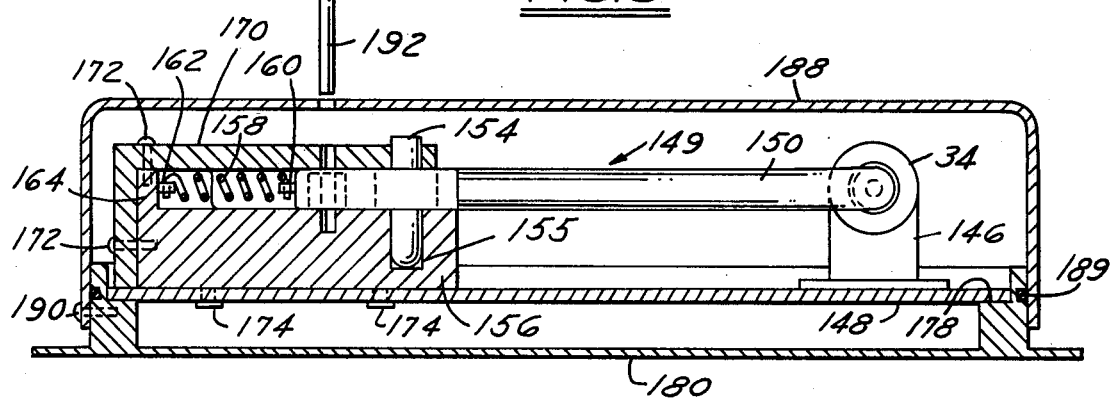

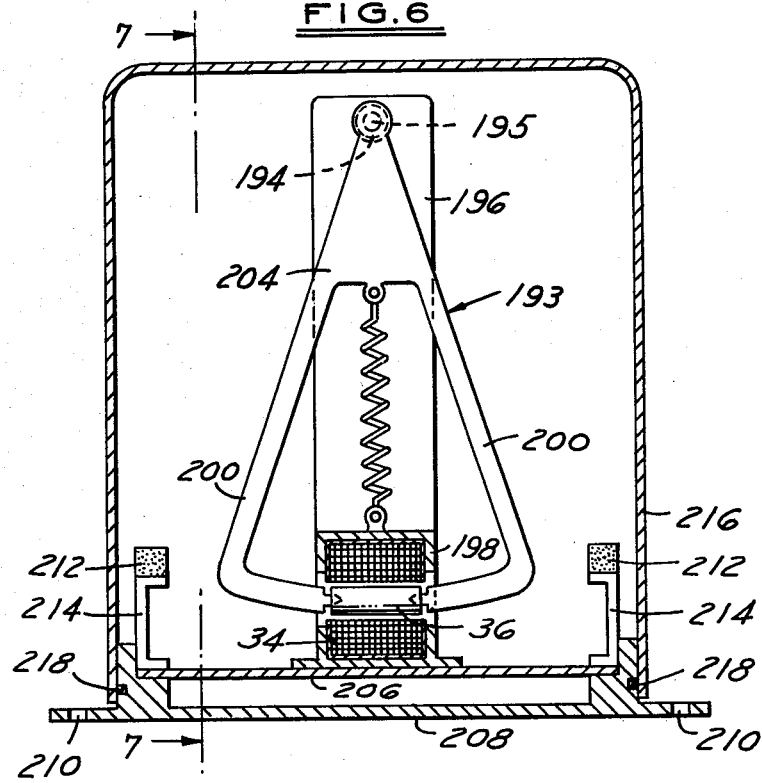
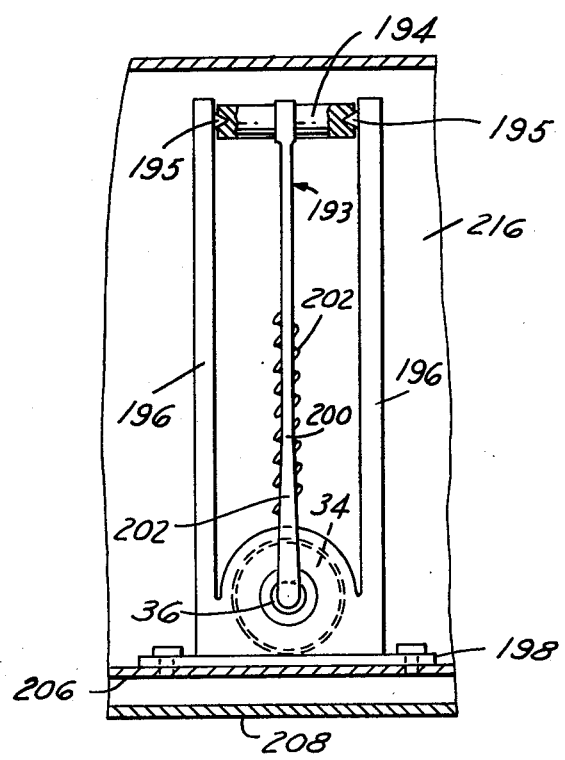

TRAILER BRAKE CONTROL SYSTEM

The present invention relates to brake control systems and, more particularly, to systems for automatically applying braking forces at the wheels of a towed vehicle or trailer.

General objects of the present invention are to provide a system for automatically applying trailer brakes in response to a sensed condition which requires braking, and to provide a self-contained sensor or transducer for detecting such condition.

More specifically, it is an object of the present invention to provide a control system which automatically applies trailer brakes when braking is required independently of a direct control by a trailer operator, which automatically senses a trailer sway condition and applies trailer brakes to correct such condition, and/or which automatically senses application of the tractor brakes and applies trailer brakes in correspondence therewith.

Further objects of the invention are to provide an economical and reliable transducer for detecting the angular velocity of a rotating body, specifically a braked trailer wheel, and to provide an inertial sensor or transducer for detecting acceleration of a movable body, specifically lateral and/or longitudinal acceleration of a trailer.

The invention, together with additional objects, features and advantages thereof, will be best understood from the following description when read in conjunction with the accompanying drawings in which:

FIG. 4 is a plan view of an inertial sensor in accordance with the invention and useful in the embodiments of FIGS. 1-3;

FIG. 5 is a sectional view taken along the line 5—5 in FIG. 4;

FIG. 6 is an elevational view of an alternative embodiment of the inertial sensor in accordance with the invention; and FIG. 7 is a sectional view taken along the line 7—7 in FIG. 6.

In accordance with one aspect of the present invention, a trailer brake control system is provided which includes a sensor or transducer for detecting a condition wherein trailer brakes should be applied and a control circuit for applying trailer brakes in response to such sensed condition. The sensor preferably comprises an inertial-type sensor which is disposed to detect a trailer sway condition as a function of trailer acceleration in the lateral direction, i.e., in a direction transverse to the direction of travel, and/or to detect application of tractor brakes as a function of the resulting negative acceleration or deceleration of the tractor/trailer combination in the longitudinal direction, i.e., the direction of travel. The terms "tractor" and "trailer" are to be read in the broad sense in the following description and claims to encompass any type of towing or towed vehicle in an articulated vehicle system to which the invention may be applied. Similarly, unless otherwise noted, the term "acceleration" is to be read in the broad sense as encompassing both positive acceleration and negative acceleration, the latter of which is often termed "deceleration". The term "braked wheel" means a vehicle wheel which possesses braking means and, therefore, is capable of being braked.

Figure 1:
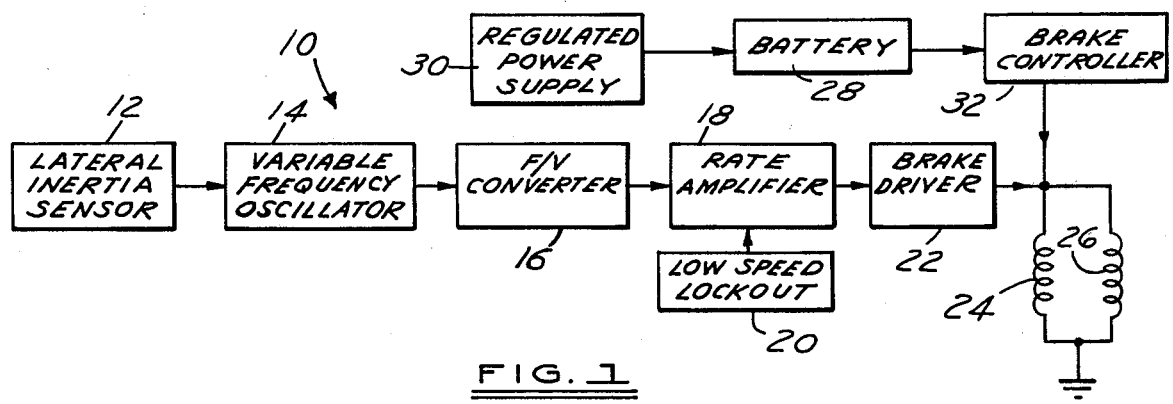
FIG. 1 is a functional block diagram of a presently preferred embodiment of the invention for sensing and correcting a trailer sway condition.

Referring to FIG. 1, a first embodiment 10 of the invention which is specifically adapted for correcting a trailer sway condition comprises an inertial sensor or transducer 12 disposed on the trailer body to detect trailer acceleration in a direction lateral to the direction of travel, which acceleration is indicative of side-to-side or lateral swaying of the trailer behind the tractor. A variable frequency oscillator 14 has an output frequency which is factory set at a nominal design frequency and which varies as a function of an input received from sensor 12. The output of oscillator 14 is connected to a frequency-to-voltage converter 16 which provides a d.c. output to a rate amplifier 18 as a linear function of the output frequency of oscillator 14. A low speed lockout circuit 20 is connected to rate amplifier 18 to enable operation of the rate amplifier and, hence, the entire control circuit 10 only when the trailer is travelling at a speed which exceeds a preselected threshold.

The output of rate amplifier 18 is connected to a brake driver amplifier 22 which has an output connected to the electrically actuated brake coils 24,26. Brake coils 24,26 may be part of the electromagnets or pucks of conventional electric brakes, such as that shown in the U.S. patent of Brede et al U.S. Pat. No. 3,244,259, for example. Preferably, the braked wheels (not shown) corresponding to coils 24,26 are disposed on a common axle or the like on respective lateral sides of the trailer, so that actuation of the trailer brakes in response to a detected sway condition applies a uniform drag on the trailer, and thereby tends to align the trailer behind the tractor. A vehicle battery 28 is connected to a regulated power supply 30 and to a brake controller 32 which is responsive to a tractor operator, either directly as through an operator handle or indirectly as through the tractor brake system, to apply trailer brakes independently of the sway control. Controller 32 may be of the type shown in the U.S. Pat. Nos. of Hubbard 3,371,253 or VandenBroek 3,503,652.

Figure 2:
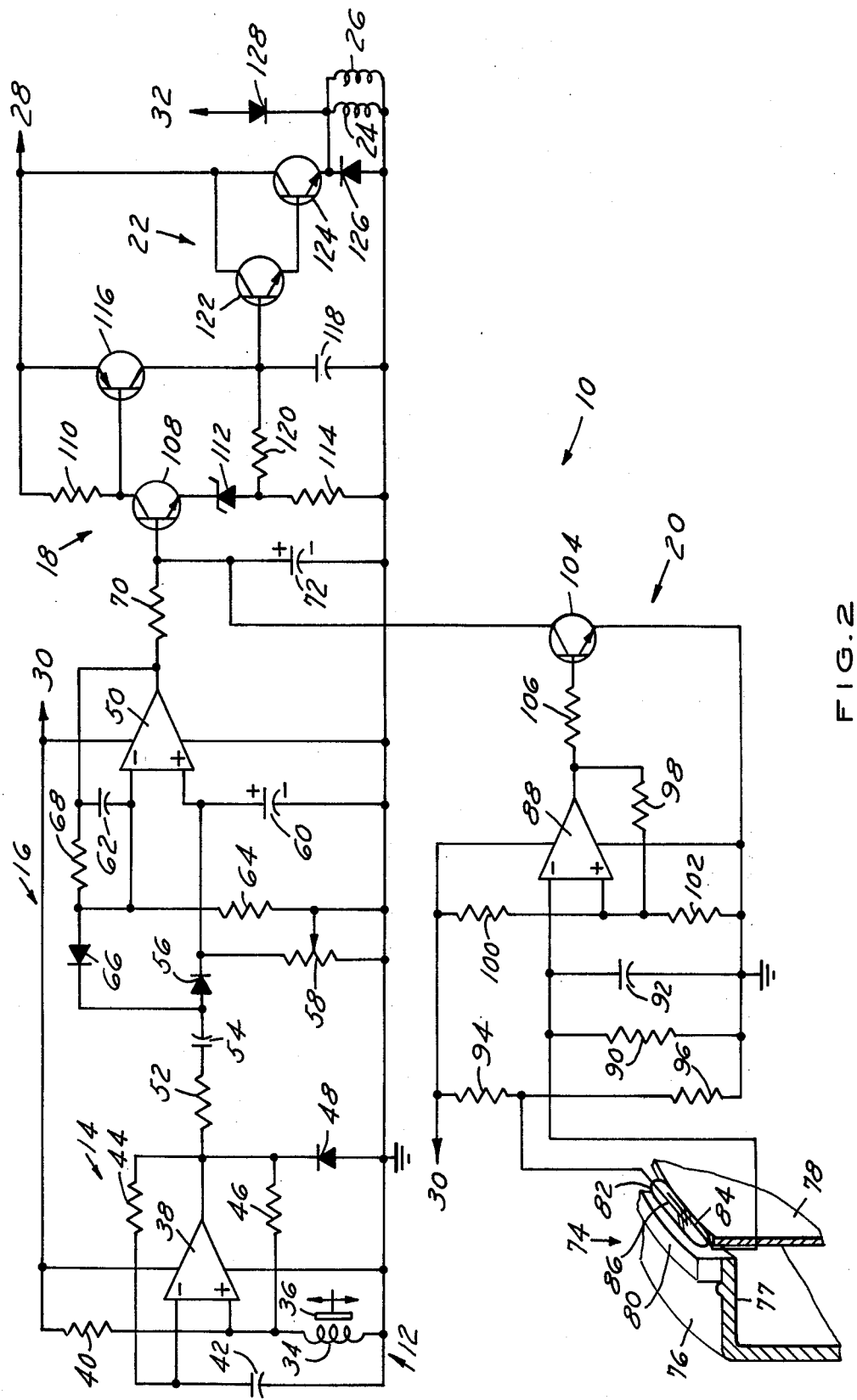
FIG. 2 is a schematic diagram of a presently preferred embodiment of the control system illustrated in FIG. 1 and includes a fragmentary perspective view of a wheel speed sensor in accordance with the invention.

Referring to FIG. 2, sensor 12 preferably comprises an electrical coil 34 adapted to be rigidly mounted to the trailer body (not shown) and a movable core or slug 36 of magnetically permeable material magnetically coupled to coil 34 to vary the inductance of coil 34 as a function of the position of core 36 relative to the coil. In a sway control embodiment of the invention, core 36 is preferably spring-biased to a central position relative to coil 34 and is movable laterally of the coil and trailer to decrease the inductance of coil 34 in linear proportion to lateral trailer acceleration in either direction. More specifically, coil 34 is affixed to the trailer and accelerates laterally therewith while core 36, due to the inertia thereof, tends to remain in fixed position. Thus, lateral trailer acceleration causes movement of coil 34 and core 36 relative to each other. Coil 34 and core 36 are preferably substantially symetrical in the lateral direction of the trailer such that identical levels of acceleration in either direction will result in substantially identical changes in coil inductance. Presently preferred embodiments of sensor 12 will be discussed in detail hereinafter in connection with FIGS. 4–7.

Oscillator 14 illustrated in FIG. 2 comprises an operational amplifier 38 having a non-inverting input connected through coil 34 to electrical ground and through a resistor 40 to power supply 30. The inverting input of amplifier 38 is connected through a capacitor 42 to ground and to the amplifier output through a resistor 44. The output of amplifier 38 is also connected to the non-inverting input thereof through the resistor 46 and to ground through the cathode-anode junction of a diode 48. Thus, oscillator 14 is of generally conventional configuration and is factory tuned on assembly, and in conjunction with sensor 12, to a nominal output frequency. Oscillator 14 may have any convenient nominal frequency and frequency range substantially greater than the frequency of trailer sway. Oscillator frequencies of ten to fifty kilohertz and frequency range of seventy percent are considered convenient. The frequency of trailer sway oscillation about the tractor/trailer hitch depends upon a number of parameters, including trailer size, but does not exceed one hertz for conventional trailers.

Frequency-to-voltage converter 16 comprises an operational amplifier 50 having a non-inverting input which receives the output of oscillator 14 at the output of amplifier 38 through a resistor 52, a coupling capacitor 54 and anode-cathode junction of a diode 56. The non-inverting input of amplifier 50 is also connected to ground through the parallel combination of an adjustable resistor 58 and a capacitor 60. The inverting input of amplifier 50 is connected to the output thereof through a capacitor 62, to ground through a resistor 64 and to the junction of diode 56 and capacitor 54 through the anode-cathode junction of a diode 66. A resistor 68 is connected across capacitor 62. The output amplifier 50 is connected through a resistor 70 and then through a filtering or smoothing capacitor 72 to ground. The half-cycle voltages of the square wave output from oscillator 14 are alternately coupled to capacitors 60,62 through diodes 56.66 and the incremental charges thus stored on the capacitors are alternately partially dissipated through resistors 56,68 during respectively opposite half-cycles. Thus, the average voltage stored in each capacitor 50,62 and, hence, the average output of amplifier 50 are proportional to input oscillator frequency. The output of amplifier 50, which appears across capacitor 72, is therefore a substantially d.c. signal which is linearly proportional to the oscillator output frequency. The ratio of resistors 68,64 determines the overall gain of amplifier 50. Resistor 58 is factory adjusted such that the output from amplifier 50 is at a preselected level at the nominal design frequency of oscillator 14 in conjunction with sensor 12.

Low speed lockout circuit 20 includes a transducer or sensor 74 for indicating the angular velocity of a braked trailer wheel of the type which includes a brake drum 76 or the like rotatably coupled to the trailer wheel (not shown) for providing a braking surface 77 and suitable breaking means (not shown), such as the electric brake shown in the above-referenced Brede et al patent, mounted internally of drum 76 in fixed position relative to the trailer body on a backing plate 78 or the like affixed to a trailer axle. Transducer 74 comprises a magnet 80 of alnico or ceramic material, for example, mounted on an outer peripheral edge of brake drum 76 and magnetized in the direction of the drum circumference. A reed switch 82 is mounted on backing plate 78 adjacent to and at substantially the radius of the circular path described by magnet 80 as the brake drum (and wheel) rotate. Reed switch 82 includes normally-open switch contacts 84,86 which close in the usual fashion in response to passage of magnet 80 adjacent thereto. Thus, the contacts of reed switch 82 alternately close and then reopen once during each revolution of the drum and wheel, thereby effectively to provide a periodic signal directly responsive and proportional to wheel angular velocity.

The inverting input of an operational amplifier 88 is connected to switch contact 84, and through the parallel combination of a resistor 90 and a capacitor 92 to ground. The resistors 94,96 are connected in series between power supply 30 and ground, and the junction therebetween is connected to contact 86. The non-inverting input of amplifier 88 is connected through a resistor 98 to the output thereof, through a resistor 100 to supply 30 and through a resistor 102 to ground. An NPN transistor 104 has its base connected to the output of amplifier 88 through a resistor 106, its collector connected to ground, and its emitter connected to the junction of resistor 70 and capacitor 72. When switch 82 is closed by proximity of magnet 80, energy is fed through resistor 94 and the closed switch to capacitor 92 and stored thereon. When the switch contacts are thereafter opened, and until magnet 80 again revolves into proximity with switch 82 to close the switch contacts, the charge on capacitor 92 is gradually dissipated through resistor 90. The capacitor charge rate during switch closure, which is determined by resistor 94, and the discharge rate when the switch is open, which is determined by resistor 90, are selected such that the charge level on capacitor 92 is proportional to the frequency of periodic switch closure, and, hence, to angular wheel velocity at least over a low trailer and wheel speed range up to the low speed lockout threshold. When the velocity of the monitored wheel and, hence, the trailer is below the threshold set by resistors 100,102, amplifier 88 and transistor 104 are turned on and effectly connect the output of converter 16 to ground thereby to inhibit sway control. Conversely, when the wheel velocity signal on capacitor 92 exceeds the threshold, amplifier 88 and transistor 104 turn off and enable operation of the sway control circuitry. A low speed lockout threshold corresponding to a trailer speed on the order to thirty-two miles per hour is appropriate for medium size travel trailers, for example. The voltage input terminals of amplifiers 38, 50 and 88 are connected to power supply 30 and ground in the usual fashion.

Rate amplifier 18 comprises an NPN transistor 108 having a base connected to the junction of resistor 70 and capacitor 72, and a collector connected through a resistor 110 to battery 28. The emitter of transistor 108 is connected through the cathode-anode junction of a zener diode 112 and then through a resistor 114 to ground. Zener diode 112 preferably provides a voltage threshold for conduction at the base-emitter junction of transistor 108 which substantially corresponds to the d.c. signal level on capacitor at the nominal oscillator frequency. Thus, transistor 108 turns on and conducts current through resistor 114 as a function of the extent to which the d.c. signal across capacitor 72 exceeds the nominal level or voltage on capacitor 72, i.e., the extent to which the oscillator output frequency differs or departs from the nominal frequency with slug 36 centered with respect to coil 34. A PNP transistor 116 has an emitter connected to battery 28, a base connected through a filter capacitor 118 to ground and through a resistor 120 to the junction of resistor 114 and diode 112. Thus, the voltage across capacitor 118 resulting from conduction of rate amplifier transistors 108,116 is a linear function of the above-noted frequency differential, i.e., change from nominal, with the rate amplifier gain being determined by resistors 120,114.

Brake driver 22 comprises a pair of NPN transistors 122,124 arranged in a typical Darlington configuration with the base of transistor 122 being connected to the collector of transistor 116 and the collectors of both transistors 122,124 being connected to battery 28. The emitter of transistor 124 is connected through brake actuator coils 24,26 to ground, and a diode 126 is connected across coils 24,26 in the reverse-voltage direction to suppress inductive ringing in the coils. Controller 32 (FIG. 1) is connected to coils 24,26 through a forward isolation diode 128. Transistors 122,124 conduct current from battery 28 to coils 24,26 as a linear function of the voltage across capacitor 118, and thus, as a linear function of the above-mentioned frequency differential. The base-emitter junction voltage drops in transistors 122,124 provide a minimum frequency differential threshold which corresponds to a minimum sway condition which must be encountered before trailer brakes will be applied. A higher minimum may be empirically selected and may be provided by connecting diodes in series with the base of transistor 122 or by increasing the threshold breakdown level of zener diode 112.

Figure 3:
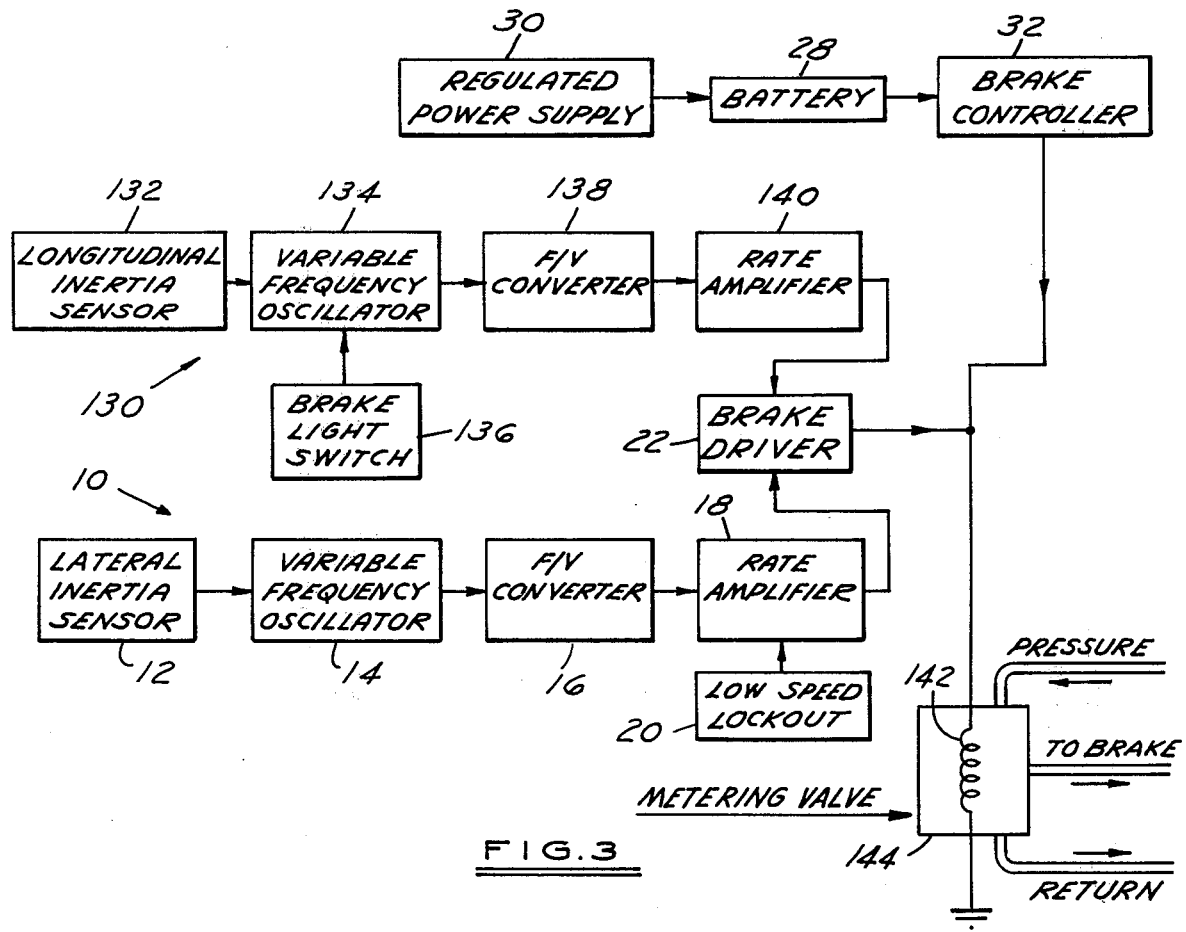
FIG. 3 is a functional block diagram of an alternative embodiment of the invention for both correcting trailer sway and automatically applying trailer brakes when tractor brakes have been applied.

FIG. 3, wherein reference numerals identical to those used in FIGS. 1 and 2 indicate identical elements, illustrates an alternative embodiment of the invention comprising both the sway control circuit 10 of FIG. 1 and a circuit 130 for automatically applying the brakes of a trailer when the tractor brakes are actuated. Circuit 130 includes an inertia sensor or transducer 132 similar to sensor 12 discussed in connection with FIGS. 1 and 2 but having a core disposed for movement longitudinally of the trailer with respect to the coil, i.e., in the line of travel, when tractor brakes are applied. More specifically, the core of transducer 132 is disposed to move by inertia toward the front of the trailer as a function of tractor/trailer (and coil) deceleration (negative acceleration) which results from application of the tractor brakes by a tractor operator, for example. As will be evident from the discussion to follow, either of the transducers to be discussed in connection with FIGS. 4–7 may be used at 132.

A variable frequency oscillator 134 receives a first input from transducer 132 and second input from the tractor brake light switch 136 to enable operation of circuit 130 only when tractor brakes are being applied and, conversely, to inhibit operation when tractor brakes are not applied. Oscillator 134 is connected through a frequency-to-voltage converter 138 and a rate amplifier 140 to brake driver 22. Amplifiers 18,140 may be connected to the base of transistor 122 (FIG. 2) in driver 22, for example, through suitable isolation diodes (not shown). Brake driver 22 and brake controller 32 are connected to the electrically-operated actuator coil 142 of a hydraulic or pneumatic metering valve to apply fluid pressure at the trailer brakes as a proportional function of the brake driver output. Oscillator 134, converter 138 and amplifier 140 are similar to the corresponding elements in sway control circuit 10 and need not be discussed in further detail. Similarly, operation of circuit 130 in automatically applying trailer brakes will be apparent from the description already set forth.

FIGS. 4 and 5 illustrate one presently preferred embodiment of transducer 12 in FIGS. 1–3 or transducer 132 in FIG. 3 wherein coil 34 is mounted by a bracket 146 to a support sheet 148. Core 36 is carried coaxially within coil 34 by a yoke 149 having a pair of axially opposed caliper-arms 150 which embrace the ends of core 36 from the direction of the coil axis. The base 152 of yoke 149 has a pivot pin 154 press fitted transversely therethrough and extending into a corresponding recess 155 in a base block 156 such that yoke 149 may pivot in a horizontal plane about the axis of pin 134 to move core 36 in an arcurate path relative to coil 34. A spring 158 extends between an apertured ear 160 on yoke base 152 and an opposing ear 162 on a flange 164 extending upwardly from base block 156. As best appreciated from FIG. 4, spring 158 and yoke base 152 are aligned in assembly with coil 34, and spring 158 resiliently biases core 36 to a nominal position axially centered within coil 34. Snubber pads 166,168 (FIG. 4) are respectively mounted on block 156 and plate 148 laterally of yoke 149 to limit pivotal travel of the yoke. A cap 170 is mounted on block 156 by screws 172 (FIG. 5) and pivotally captures yoke 149 against the base block.

Block 156 is mounted by screws 174 to support sheet 148 which preferably comprises a printed circuit board or the like upon which is mounted the remaining circuitry of FIGS. 1–2 or FIG. 3. Sheet 148 is mounted by screws 176 (FIG. 4) on a ledge 178 of a rectangular base plate 180 which has holes 182 (FIG. 4) extending therethrough for mounting the entire assembly at any suitable location on a trailer. For example, the elongated dimension of the sensor is to be mounted in the direction 184 (FIG. 4) of trailer travel to detect acceleration in the lateral direction 186 when the sensor is configured for sway control. A protective cover 188 (not shown in FIG. 4) is mounted to base plate 180 by screws 190 with a seal 189 of resilient material disposed therebetween. A pin 192 may be inserted through aligned holes in cover 188, cap 170, yoke base 152 and base block 156 to prevent oscillation of the yoke during transport and installation of the sensor.

In operation for trailer sway control, for example, coil 34 is affixed to the trailer body and follows the motion thereof resulting from lateral trailer acceleration. However core 36 is substantially freely suspended laterally of the trailer body and, due to the inertia thereof, tends to remain in fixed position against the force of spring 158. The resulting displacement of the core with respect to the coil is preferably over a relatively small arc so as to approximate relative displacement merely in the axial direction of the coil. Thus, the change in coil inductance is substantially linearly proportional to coil/core relative displacement. Eventually, the force of spring 158 will overcome the inertia of core 36 and return the core to the centered position relative to the coil. The characteristics of spring 158, the number of coil turns in coil 34 and the mass of coil 36 are all empirically selected to yield a desired sustantiatedly linear sensitivity at oscillator 14 (FIGS. 1–3) or 134 (FIG. 3) over the normally expected acceleration range.

An alternative embodiment of the inertial sensor or transducer provided by the invention is illustrated in FIGS. 6–7 and comprises a yoke 193 having a pin 194 extending transversely therethrough and rotatably journalled between the conical pins 195 extending inwardly from the stanchions 196 to pivot in a vertical plane. Coil 34 is mounted in a block 198, and core 36 is centered within coil 34 by depending yoke caliper arms 200. A centering spring 202 extends between the base 204 of yoke 193 and block 198 disposed therebelow, pin 194, spring 202 and coil 34 being vertically aligned. Block 198 is carried by a sheet 206, preferably a printed circuit board as detailed above, which is mounted on a base plate 208 having holes 210 (FIG. 6) for mounting the sensor on a trailer. Snubber pads 212 are mounted by stand-offs 214 to plate 206 to limit travel of yoke 193. A cover 216 is affixed to plate 208 with a seal 218 disposed therebetween. Operation of the embodiment of FIGS. 6–7 will be evident from the foregoing description in connection with FIGS. 4–5.

Thus, in its broadest system aspects, the present invention envisions variable frequency oscillator means (14 in FIGS. 1–3 and/or 134 in FIG. 3), a sensor means adapted to be mounted on a trailer and operable when so mounted to detect a condition requiring brake regulation as a function of lateral (12) and/or longitudinal (132) acceleration of the trailer and to vary the output frequency of the oscillator means as a function of such trailer acceleration, and means (e.g. rate amplifier 18 and/or 140 and brake driver 22) for regulating trailer brakes as a function of such output frequency.

Although the invention has been described in connection with several specific embodiments thereof, many alternatives and modifications are envisioned. For example, sway control sensor 12 in FIGS. 1 and 2, could be of a type responsive to angular rather than lateral trailer acceleration for detecting a sway condition. Similarly, both the lateral (12) and the longitudinal (132) sensors could comprise inertial sensors employing other than electromagnetic sensing techniques, such as photo-optical sensing techniques for example. Transducer 74 in FIG. 2 may embody magnetically operable switch means other than a reed switch 82, such as an appropriately biased Hall-effect generator switch or the like. Similarly, other types of wheel speed transducers, such as a conventional variable reluctance transducer and a suitable rectifier, could be used in place of the transducer 74 in FIG. 2. In the combined sway and automatic brake control embodiment of FIG. 3, separate oscillators, converters and rate amplifiers have been illustrated. However, the corresponding elements could readily be combined, with the combined rate amplifier being configured as a dual-slope amplifier responsive to the tractor brake light switch, for example, for applying trailer brakes as differing functions of frequency differential depending upon whether a sway control (trailer brakes not applied) or an automatic braking (trailer brakes applied) mode of operation is required. Indeed, the invention is intended to embrace the above-noted and all other alternatives, modifications and variations as fall within the spirit and broad scope of the appended claims.

The invention claimed is:

1. A brake control system for applying brakes at trailer wheels as a function of trailer acceleration comprising variable frequency oscillator means having a nominal output frequency and an output frequency range both substantially greater than one hertz, sensor means adapted to be disposed on a trailer and responsive when so disposed to acceleration of said trailer for varying the output frequency of said oscillator means from said nominal frequency as a function of such acceleration, and means for regulating braking at the trailer wheels as a function of a difference between said oscillator output frequency frequency and said nominal frequency; said regulating means comprising converter means for receiving said oscillator output and providing a d.c. control signal as a function of said difference between said oscillator output and said nominal output, and brake control means for controlling braking at the trailer wheels as a proportional function of said d.c. control signal.

2. The brake contol system set forth in claim 1 wherein said regulating means is adapted to apply trailer brakes in linear proportion to said difference between said output frequency and said nominal frequency.

3. The brake control system set forth in claim 1 wherein said regulating means includes means responsive to said difference for applying trailer brakes only when said difference exceeds a preselected threshold.

4. The brake control system set forth in claim 1 for correcting a sway condition at said trailer wherein said sensor means is adapted to be responsive to acceleration of said trailer in a direction transverse to the direction of forward trailer travel for varying said output frequency.

5. The brake control system set forth in claim 4 for use on trailers having at least one braked wheel disposed on either side of said trailer wherein said regulating means is adapted to apply substantially equal braking at each said trailer braked wheel.

6. The brake control system set forth in claim 4 further comprising low speed lockout means for inhibiting operation of said regulating means when the traveling speed of a said trailer is below a first preselected threshold.

7. The brake control system set forth in claim 1 for applying trailer brakes when tractor brakes are applied by a tractor operator wherein said sensor means is adapted to be responsive to longitudinal negative acceleration of said trailer for varying said output frequency, and wherein said regulating means is adapted to apply trailer brakes as a function of a difference between said output frequency and said nominal frequency.

8. The brake control system set forth in claim 7 further comprising means adapted to be responsive to actuation of a tractor brake system, said regulating means applying said trailer brakes only when the tractor brake system is actuated by a tractor operator.

9. The brake control system set forth in claim 8 wherein said means adapted to be responsive to said tractor brake system comprises means responsive to actuation of a tractor brake light switch.

10. The brake control system set forth in claim 1 wherein said sensor means comprises coil means operatively connected to said oscillator means such that said oscillator output frequency varies with the inductance of said coil means and core means magnetically coupled to said coil means to vary the inductance of said coil means as a function of the position of said core means relative to said coil means, said coil means and said core means being adapted to be movable with respect to each other in response to trailer acceleration.

11. The brake control system set forth in claim 10 wherein said coil means is adapted to be mounted in fixed position relative to a trailer and said core means is movable with respect to said coil means as a function of trailer acceleration.

12. The brake control system set forth in claim 1 comprising a first said oscillator means having a first nominal output frequency substantially greater than one hertz, a first said sensor means adapted to be responsive to lateral acceleration of a trailer for varying the output frequency of said first oscillator from said first nominal frequency, a first said regulating means for applying trailer brakes in proportion to a difference between said first output frequency and said first nominal frequency to correct a sway condition at the trailer, a second said oscillator means distinct from said first oscillator means and having a second nominal output frequency, a second said sensor means adapted to be responsive to longitudinal deceleration of a trailer for varying the output frequency of said second oscillator means from said second nominal frequency and a second said regulating means for automatically applying trailer brakes in proportion to a difference between said second output frequency and said second nominal frequency when tractor brakes have been applied by a tractor operator.

13. A brake control system for correcting a sway condition on trailers having at least one braked wheel comprising variable frequency oscillator means having a nominal output frequency, sensor means adapted to be disposed on a trailer and responsive when so disposed to acceleration of said trailer in a direction transverse to the direction of forward trailer travel for varying the output frequency of said oscillator means from said nominal frequency as a function of said acceleration, regulating means for applying brakes at the trailer wheels as a function of a difference between said oscillator output frequency and said nominal frequency, and low speed lockout means for inhibiting operation of said regulating means when the traveling speed of a said trailer is below a first preselected threshold, said low speed lockout means including means for sensing angular velocity of a trailer wheel comprising magnet means rotatably carried by said trailer wheel and switch means fixedly carried with respect to said wheel adjacent the path of said magnet means on said wheel and responsive to passage of said magnet means thereby to provide a wheel speed signal as a periodic function of said wheel angular velocity.

14. The brake control system set forth in claim 13 wherein said switch means comprises a reed switch.

15. The brake control system set forth in claim 14 wherein said trailer wheel comprises a braked trailer wheel having a brake drum rotatably carried by said wheel and plate means for mounting brake application means adjacent said drum, and wherein said magnet means is mounted on an outside peripheral edge of said drum and said reed switch is mounted on said plate means at substantially the radius of said peripheral edge.

16. A brake control system for correcting a sway condition on trailers having at least one braked wheel comprising variable frequency oscillator means having a nominal output frequency, sensor means adapted to be disposed on a trailer and responsive when so disposed to acceleration of said trailer in a direction transverse to the direction of forward trailer travel for varying the output frequency of said oscillator means from said nominal frequency as a function of said acceleration, regulating means for applying brakes at the trailer wheels as a function of a difference between said oscillator output frequency and said nominal frequency, and low speed lockout means for inhibiting operation of said regulating means when the traveling speed of a said trailer is below a first preselected threshold, said regulating means including means responsive to said difference for applying said trailer brakes only when said difference exceeds a second preselected threshold.

17. The brake control system set forth in claim 16 wherein said first preselected threshold is substantially equal to thirty-two miles per hour.

18. A brake control system for use on trailers having at least one braked wheel comprising oscillator means having a variable output frequency, sensor means adapted to be disposed on a trailer and responsive when so disposed to acceleration of said trailer for varying the output frequency of said oscillator means as a function of said acceleration, and means for regulating braking at the trailer wheels as a function of said oscillator output frequency; said sensor means comprising an electrical coil adapted to be mounted in fixed position with an axis oriented substantially horizontally relative to a trailer and operatively connected to said oscillator means such that said oscillator output frequency varies with the inductance of said coil, and a core of magnetically permeable material disposed internally of said coil and movable substantially axially with respect to said coil to vary the inductance of said coil as a function of trailer acceleration.

19. The brake control system set forth in claim 18 wherein said sensor means further comprises a yoke mounted to pivot about an axis perpendicular to said coil axis and having caliper legs embracing said core from opposed directions with respect to said coil axis.

20. In combination with a braked vehicle wheel which includes a brake drum providing a braking surface carried by the wheel for corotation therewith and a backing plate for mounting brake application means adjacent said braking surface and in fixed position relative to the vehicle, a transducer for sensing angular velocity of the wheel and comprising magnet means carried at a peripheral edge of said brake drum closely adjacent said backing plate to rotate with the wheel in a fixed path relative to said plate, a reed switch carried by said plate at substantially the radius of said adjacent peripheral edge and adapted to assume a closed conductive condition when said magnet means is adjacent said switch and an open conductive condition when said magnet means is remote from said switch, and circuit means responsive to successive periodic changes in said conductive conditions of said switch to provide an indication of wheel angular velocity, said circuit means including a source of electrical energy, means for storing electrical energy from said source in said closed conductive condition of said switch and blocking energy from said storage means in said open conductive condition of said switch, and means for bleeding stored energy from said storage means directly electrically connected in parallel with said storage means so as to bleed energy from said storage means independently of said switch such that the average energy level on said storage means increases in direct proportion to said angular velocity.

21. A transducer for sensing acceleration of a movable body comprising an electrical coil adapted to be mounted in fixed position relative to a said body and having a coil axis, a core of magnetic material magnetically coupled to said coil such that inductance of said coil varies as a function of the position of said core relative to said coil, and spring means mounting said core internally of said coil for resilient movement with respect to said coil substantially in the direction of said coil axis such that said coil inductance varies as a function of acceleration of the movable body in the direction of said coil axis.

22. The transducer set forth in claim 21 wherein said spring means comprise a yoke mounted to pivot about an axis and having caliper legs embracing said core from opposed directions with respect to said coil axis such that said core is adapted to be pivoted in an arc which is substantially coincident with said coil axis adjacent said coil, and a spring connected to said yoke for resiliently biasing said yoke to a normal position wherein said core is centrally positioned in said coil.

* * * * *